United States Patent [19]

Franek et al.

[11] Patent Number: 4,830,655
[45] Date of Patent: May 16, 1989

[54] HIGH TEMPERATURE-RESISTANT MATERIAL FOR DEVICES USED FOR FORMING GLASS OPTICAL ELEMENTS WITH HIGH SURFACE QUALITY

[75] Inventors: Henning Franek, Braunfels-Tiefenbach; Heinz Broemer, Wetzlar-Hermannstein; Klaus Deutscher, Wetzlar, all of Fed. Rep. of Germany

[73] Assignee: Ernst Leitz Wetzlar GmbH, Wetzlar, Fed. Rep. of Germany

[21] Appl. No.: 57,659

[22] Filed: Jun. 9, 1987

Related U.S. Application Data

[63] Continuation of Ser. No. 705,196, Feb. 25, 1985, which is a continuation of PCT DE84/00128 filed Jun. 8, 1984, published as WO85/00162 on Jan. 17, 1985, abandoned.

[30] Foreign Application Priority Data

Jun. 23, 1983 [DE] Fed. Rep. of Germany ....... 3322523

[51] Int. Cl.$^4$ .............................................. C03B 23/00
[52] U.S. Cl. ..................................... 65/286; 65/374.1; 65/374.13
[58] Field of Search .................. 65/374.1, 374.13, 286, 65/292, 374.1, 374.13, 268; 106/38.27, 38.9; 264/337, 338

[56] References Cited

U.S. PATENT DOCUMENTS

| | | | |
|---|---|---|---|
| 1,809,872 | 6/1931 | Siderberg | 106/38.27 |
| 2,809,898 | 10/1957 | Thiess | 264/337 |
| 2,960,747 | 11/1960 | Dungan | 264/337 |
| 3,136,011 | 6/1964 | Peras | 106/38.27 |
| 3,141,756 | 7/1964 | Giffen | 65/372 |
| 3,529,654 | 9/1970 | Kanter | 106/38.27 |
| 3,537,949 | 11/1970 | Brown et al. | 106/38.27 |
| 3,833,347 | 9/1974 | Angle | 65/32 |
| 3,844,755 | 10/1974 | Angle | 65/32 |
| 3,859,153 | 1/1975 | Beier et al. | 106/38.27 |
| 3,900,328 | 8/1975 | Parsons et al. | 106/39.5 |
| 3,983,293 | 9/1976 | Ohuchi | 428/306 |
| 4,178,187 | 12/1979 | Huseby et al. | 106/38.9 |
| 4,391,622 | 7/1983 | Alting et al. | 65/374.13 |
| 4,552,329 | 11/1985 | Hattori et al. | 264/337 |

FOREIGN PATENT DOCUMENTS

| | | |
|---|---|---|
| 0040875 | 5/1981 | European Pat. Off. . |
| 2639259 | 3/1977 | Fed. Rep. of Germany . |
| 2202051 | 2/1974 | France . |
| 53-21214 | 2/1978 | Japan .................. 65/374.13 |
| 2021095 | 5/1979 | United Kingdom . |

OTHER PUBLICATIONS

A. E. Dodd, "Dictionary of Ceramics", published 1964, pp. 6–9, 58–59, 70–71, 240–241, and 319.

Primary Examiner—Kenneth M. Schor
Attorney, Agent, or Firm—Foley & Lardner, Schwartz, Jeffery, Schwaab, Mack, Blumenthal & Evans

[57] ABSTRACT

Inorganic material resisting to high temperatures for installations intended to form structural glass elements which, owing to the precision and the quality of the forming surface, do not require after forming any other surface treatment. The material is comprised of at least one forming surface based on at least one from the groups of a metal oxide a double metal oxide, and a crystalline solid solution. It has a monocrystalline structure. Preferred materials are $Al_2O_3$, $Cr_2O_3$, $MgAl_2O_4$ and/or $ZrO_2$.

9 Claims, No Drawings

HIGH TEMPERATURE-RESISTANT MATERIAL FOR DEVICES USED FOR FORMING GLASS OPTICAL ELEMENTS WITH HIGH SURFACE QUALITY

This application is a continuation of application Ser. No. 705,196, filed Feb. 25, 1985, which is a continuation at PCT PE84/00/28, filed Jan. 8, 1984, published as WO85/00162 on Jan. 17, 1985, now abandoned.

CROSS REFERENCE TO RELATED APPLICATION

This application is a U.S. National filing of our prior international application No. PCT/DE84/00128, which was filed on June 8, 1984 and which designates the United States of America.

BACKGROUND OF THE INVENTION

The invention relates to an inorganic, heat resistant material for devices for forming structural elements of optical glass. After the forming proccess, the structural elements may be used without any further surface treatment, such as grinding or and/or polishing, because of the accuracy and quality of the formed surface.

The production of optical structural elements, from glass is a multistage process, requiring high accuracy. In addition to the preparation of the geometrical shape, for example of curved surfaces with certain predetermined radii and their centering, the surfaces must be free of surface defects, such as scratches, grooves, etc. The surfaces must be "finish polished". These processes are time and cost intensive.

In order to shorten the grinding or milling process of optical elements (lenses, prisms, mirrors, panes), pressed glass blanks are prepared. The dimensions of the blanks correspond to those of the finished optical part, with corresponding overmeasure. The blanks are pressed from glass at a temperature such that the glass becomes plastic with a high viscosity. Heat resistant metal alloys free of forging scales are used as mold components.

The blanks prepared in this manner have a more or less dull surface, originating in the reaction of the glass with the die material and the powdered parting agents used during the process between the surface of the glass and other contact surfaces. These blanks must then be ground and polished in the conventional manner.

By providing the molds with an appropriately fine surface, it is possible to press lenses with a surface quality permitting their use in the illuminating beam path of optical insturments. However, their surfaces still have enough defects in the microrange ("orange peel effect"), so that lenses produced in this manner are not suitable for use in an optical imaging beam path.

As an improvement, the use of glass carbon on the mold surfaces is proposed in U.S. Pat. Nos. 3,900,328, 3,833,347 and 3,844,755. Optical surfaces produced by dies with mold surfaces of glass carbon are actually of a significantly higher quality. However, glass carbon oxidizes and has further detrimental properties.

A further improvement is proposed in DE-OS No. 2 639 259. The material forming the mold surfaces here consists of silicon carbide (SiC) or silicon nitride ($Si_3N_4$). However, such mateials also have significant disadvantages. Both SiC and $Si_3N_4$ are sensitive to oxygen and water vapor at elevated temperatures. The materials may decompose according to the following reaction equation:

$$SiC + 2O_2 \rightarrow SiO_2 + CO_2$$

and silicon carbide and water convert to silicon dioxide and methane according to:

$$SiC + 2H_2O \rightarrow SiO_2 + CH_4.$$

Initially, these reactions occur superficially and lead to a coating of the aforementioned materials by a protective $SiO_2$ layer. In the case of extended exposure to elevated temperatures, the reaction front penetrates into the volume of the material, whereby its volume is increased and the SiC or $Si_3N_4$, respectively, is decomposed and leaks out in the form of dust.

In addition to the reaction of atmospheric oxygen and water, the material of the mold surface must withstand the attack of the molten glass. It is generally true that the resistance of a molding tool is an inverse function of the chemical reaction gradient between the softened glass and the material of the mold. Reactions between softened glasses or glass melts and the surfaces of molding tools may occur already upon simple contact. Such reactions are designated contact reactions. According to their contact reactions, the following three groups of materials may be distinguished:

1. Acid group:
This includes $SiO_2$ materials, but also silicon carbide and silicon nitride.
2. Basic group:
The group comprises CaO and/or MgO ceramics.
3. Group indifferent to contact:
Carbon and glazing carbon are included.

It is almost impossible to bring materials of the acid group into contact with materials of the basic group without incurring destruction by contact reactions. Glass melts, in particular those to be used for optical purposes, differ greatly in their chemical compositions, i.e., they may be both acidic or basic in nature.

SUMMARY OF THE INVENTION

It is therefore the object of the present invention to avoid the chemical incompatibilities and glass production technological disadvantages resulting from the chemical nature of the known mold materials and the glass melt involved, and to select materials for the pressing of glass optical elements that are designated "contact indifferent" or "contact inert".

This object is attained according to the invention in that the material on at least one mold surface comprises a metal oxide or metal double oxide. Alternatively, the material on one mold surface may comprise a mixed crystal including at least two metal oxides or metal double oxides, or one metal oxide and one metal double oxide. The metal oxide or metal double oxide or the solid solution has a lattice energy of preferably between 9 and 16 MJ (megajoule per mole) and is present in the form of a single crystal.

According to an especially preferred embodiment of the present invention the metal oxide comprises aluminum oxide ($Al_2O_3$) in its $\alpha$- and/or $\gamma$- modification. Alternatively, chromium oxide ($Cr_2O_3$), zirconium oxide ($ZrO_2$) and/or nickel oxide (NiO) may be used as the metal oxide. It is further possible that the metal double oxide consists of a spinel with the sum formula $Me^{II}O \cdot Me_2^{III}O_3$, with the divalent metal ($Me_{II}$) being Mg, and/or Zn, and/or Fe, and/or Mn, and/or Ni, and/or Cu, and/or Co, and the trivalent metal ($Me_{III}$) being Al, and/or Fe, and/or Cr, and/or Mn, and/or Co.

The metal double oxide is, in particular, a spinel of the composition $MgAl_2O_4$ or $NiAl_2O_4$.

DETAILED DESCRIPTION OF PREFERRED EMBODIMENTS

The single crystal (monocrystal) may appropriately be one of the variations of the α-modification of aluminum oxide (α-$Al_2O_3$), i.e. sapphire ((Al, Ti, Fe)$_2O_3$) or ruby ((Al, Cr)$_2O_3$). It is further possible to have the single crystal as mixed crystal composed of another metal oxide or a metal double oxide.

The material according to the invention is used in a manner such that it is applied only as a solid material.

The starting materials intended for the material according to the invention occur in part as natural minerals of gem quality, such as for example colorless corundum (α-$Al_2O_3$), blue sapphire (α-$Al_2O_3$+additives), red ruby (α-$Al_2O_3$+additives), baddeleyite ($ZrO_2$), precious spinel ($MgAl_2O_4$) and gahnite ($ZnAl_2O_4$). On the other hand, they may be prepared by known synthesis methods in the single crystal form, i.e., as relatively large single crystals. The following are melted by the flame melting process (Verneuil process), which represents an intermediate stage between crystal growing from the melt and from the vapor phase: ruby, sapphire, corundum, rutile ($TiO_2$), spinel, chrysoberyll ($Al_2BeO_4$), etc. Hydrothermal synthesis processes are further known to prepare the initial substances for the material according to the invention.

It has proved necessary to keep the molding surfaces of the forming device as free as possible from material-dependent microstructures. For this reason, according to the invention, "single crystals" are necessary as the molding material; they have no grain boundaries, pores, etc.

Mixed crystals are defined as substances capable of accepting other ions in lattice sites of the prevailing crystal lattice, without thereby altering the crystalline structure of the pure starting crystal. It therefore represents a partial exchange of lattice components while retaining the geometrical isomorphic relationships of the original crystal lattice. Modifications are defined as substances with identical chemical sum formulas, but differing with respect to their space lattice, i.e. their packing density, their chemical and physical parameters, etc. (for example, α-, γ-$Al_2O_3$). Varieties are understood to signify special crystalline representatives characterized by intentional doping or impurities or other crystalline defects of the same modification (for example corundum, sapphire, ruby).

It has surprisingly become apparent that lattice energy represents a suitable selection criterion. The lattice energy of a crystal is defined as the amount of energy required to decompose a crystal into its structural components and to transport the latter into infinity. It represents a characteristic value for a crystal, closely related to other properties, such as compressibility, thermal expansion, melting and boiling point, hardness, etc. It is calculated, based on the Born-Haber circle process, from the different binding forces (types of bonding between the individual crystal components; attraction and repulsion forces). Certain examples of calculated lattice energies from the literature, given in megajoules per mole, are listed in the table below:

| | |
|---|---|
| $CeO_2$ | 9.6 MJ/mole |
| $ZrO_2$ | 11.2 MJ/mole |
| $TiO_2$ | 12.1 MJ/mole |
| $Y_2O_3$ | 12.7 MJ/mole |
| $GeO_2$ | 12.8 MJ/mole |
| $Fe_2O_3$ | 14.3 MJ/mole |
| $Cr_2O_3$ | 15.3 MJ/mole |
| $Ga_2O_3$ | 15.6 MJ/mole |
| $Al_2O_3$ | 15.9 MJ/mole |

The term "high temperature resistant materials" is defined as inorganic, nonmetallic oxide compounds having a softening temperature higher than about 1000° C., preferably higher than about 1500° C. In ceramic terminology such materials are designated as "refractory"; if their softening temperature is higher than 1830° C., they are referred to as "highly refractory". The approximate melting points of several starting substances are given as follows:

$ThO_2$—3300° C.
$MgO$—2800° C.
$ZrO_2$—2690° C.
$CaO$—2560° C.
$BeO$—2530° C.
$La_2O_3$—2300° C.
$Cr_2O_3$—2270° C.
$MgO.Al_2O_3$—2120° C.
$Al_2O_3$—2070° C.
$NiO$—1980° C.
$BeO.Al_2O_3$—1910° C.
$MnO$—1730° C.

A comparison of the materials according to the invention with the metals or metal alloys used heretofore clearly demonstrates the advantages of these highly resistant nonmetallic materials. In the case of mold surfaces made of metals or alloys, resectively, there is the danger that the microstructure of the grain will be sheared off. Metallic structures consist mostly of grains crystallites and the grain boundaries between them into which the additivities to the metal enter. This bare structure, initially free of oxide layers, effects heat conduction that differs locally, thereby affecting the surface detrimentally. Furthermore, most metals tend to recrystallize under extended exposure to elevated temperatures, i.e., there is a preferential growth of large grains at the expense of smaller ones. Only when, after some usage, an oxide film has formed on the mold surface, is this film able to mitigate the contours of the grain. The mold surface has then attained the height of its ability to perform. However, the extent of the oxide film formation depends on the equilibrium between the input and removal of heat through the glass charge and on the conduction of heat by the mold material, and on the dissolution process between the glass and the adjacent surface.

It is hardly possible to prevent the differential stressing of the molds during filling, the forming process and the shaping. Consequently, the oxide layer forming on the metals will be distributed inhomogeneously over the mold surface. In certain locations, this may lead to cracking or even to exfoliation. The original smoothness of the mold surface will then be completely destroyed and the mold becomes unusable for the production of optical objects.

The latter disadvantages do not occur with mold surfaces of compact or laminar oxide materials.

The shaping device itself is prepared, for example, by means of chip forming shaping processes (for example boring, sawing, turning, milling, etc.), from a solid piece of material with subsequent final processing of the mold surfaces (honing, polishing, burnishing, glazing, buffing, etc.).

What is claimed is:

1. In a glass pressing apparatus having supported mold means for contacting and shaping glass to provide a glass optical structural element, the improvement wherein said mold means which contacts the glass surface (a) is substantially non-porous, (b) is a single crystal having a lattice energy between 9 and 16 MJ/mole, (c) consists essentially of at least one member selected from the group which is a metal oxide, a metal double oxide and a metal oxide mixed crystal, and (d) presents a mold surface of high surface quality and dimensional accuracy.

2. A device according to claim 1, wherein the metal oxide comprises aluminum oxide ($Al_2O_3$) in its $\alpha$-modification.

3. A device according to claim 1, wherein the metal oxide comprises chromium oxide ($Cr_2O_3$).

4. A device according to claim 1, wherein the metal oxide comprises zirconium dioxide ($ZrO_2$).

5. A device according to claim 1, wherein said double oxide is a metal double oxide comprising a spinel with the sum formula $Me^{II}O.Me_2^{III}O_3$, where $Me^{II}$ denotes at least one element from the group consisting of Mg, Zn, Fe, Mn, Ni, Cu and Co, and $Me^{III}$ denotes at least one element from the group consisting of Al, Fe, Cr, Mn and Co.

6. A device according to claim 1, wherein the metal double oxide comprises a spinel with the composition $MgAl_2O_4$ or $NiAl_2O_4$.

7. A device according to claim 1, wherein the mixed crystal comprises one of the varieties of the $\alpha$-modification of aluminum oxide ($\alpha$-$Al_2O_3$).

8. A device according to claim 7, wherein the mixed crystal comprises sapphire or ruby.

9. A device according to claim 1, wherein said mold means is a metal oxide and metal double oxide.

* * * * *